(12) United States Patent
Marchand

(10) Patent No.: US 10,759,046 B2
(45) Date of Patent: Sep. 1, 2020

(54) LIQUID HANDLING APPARATUS

(71) Applicant: LABOMATIC INSTRUMENTS AG, Allschwil (CH)

(72) Inventor: Claude Louis Marchand, Hölstein (CH)

(73) Assignee: LABOMATIC INSTRUMENTS AG, Allschwil (CH)

( * ) Notice: Subject to any disclaimer, the term of this patent is extended or adjusted under 35 U.S.C. 154(b) by 0 days.

(21) Appl. No.: 15/775,175

(22) PCT Filed: Nov. 11, 2016

(86) PCT No.: PCT/EP2016/077395
§ 371 (c)(1),
(2) Date: May 10, 2018

(87) PCT Pub. No.: WO2017/081229
PCT Pub. Date: May 18, 2017

(65) Prior Publication Data
US 2018/0319011 A1 Nov. 8, 2018

(30) Foreign Application Priority Data

Nov. 11, 2015 (DE) ........................ 10 2015 119 472

(51) Int. Cl.
*B25J 9/02* (2006.01)
*B25J 9/10* (2006.01)
*B25J 9/00* (2006.01)

(52) U.S. Cl.
CPC ............. *B25J 9/023* (2013.01); *B25J 9/0084* (2013.01); *B25J 9/104* (2013.01); *B25J 9/0096* (2013.01)

(58) Field of Classification Search
CPC ...... B25J 9/02; B25J 9/10; B23Q 1/62; B23Q 11/08
(Continued)

(56) References Cited

U.S. PATENT DOCUMENTS 4,984,959 A * 1/1991 Kato ........................ B25J 9/042
414/744.3
5,611,248 A 3/1997 Peltier
(Continued)

FOREIGN PATENT DOCUMENTS

DE 3926670 A1 2/1991
DE 4200923 A1 8/1992
(Continued)

*Primary Examiner* — Ronald P Jarrett
(74) *Attorney, Agent, or Firm* — Vivacqua Crane, PLLC

(57) ABSTRACT

The invention relates to a liquid handling apparatus for transferring liquid into and out of containers that are arranged in a substantially horizontal plane that is spanned by an X axis and a Y axis standing perpendicular to the X axis in the direction of a substantially vertical Z axis standing perpendicular to this plane. The liquid handling apparatus comprises an X slide which is travelable in the direction of the X axis and at which an arm having a Y slide is provided that is travelable in the direction of the Y axis and that is optionally configured for attaching at least one Z slide travelable in the Z axis. An X drive motor serves for driving the X slide via an X force transmission means and a Y drive motor serves for driving the Y slide via a Y force transmission means. Both motors are in fixed positions.

24 Claims, 8 Drawing Sheets

Figure 1A:
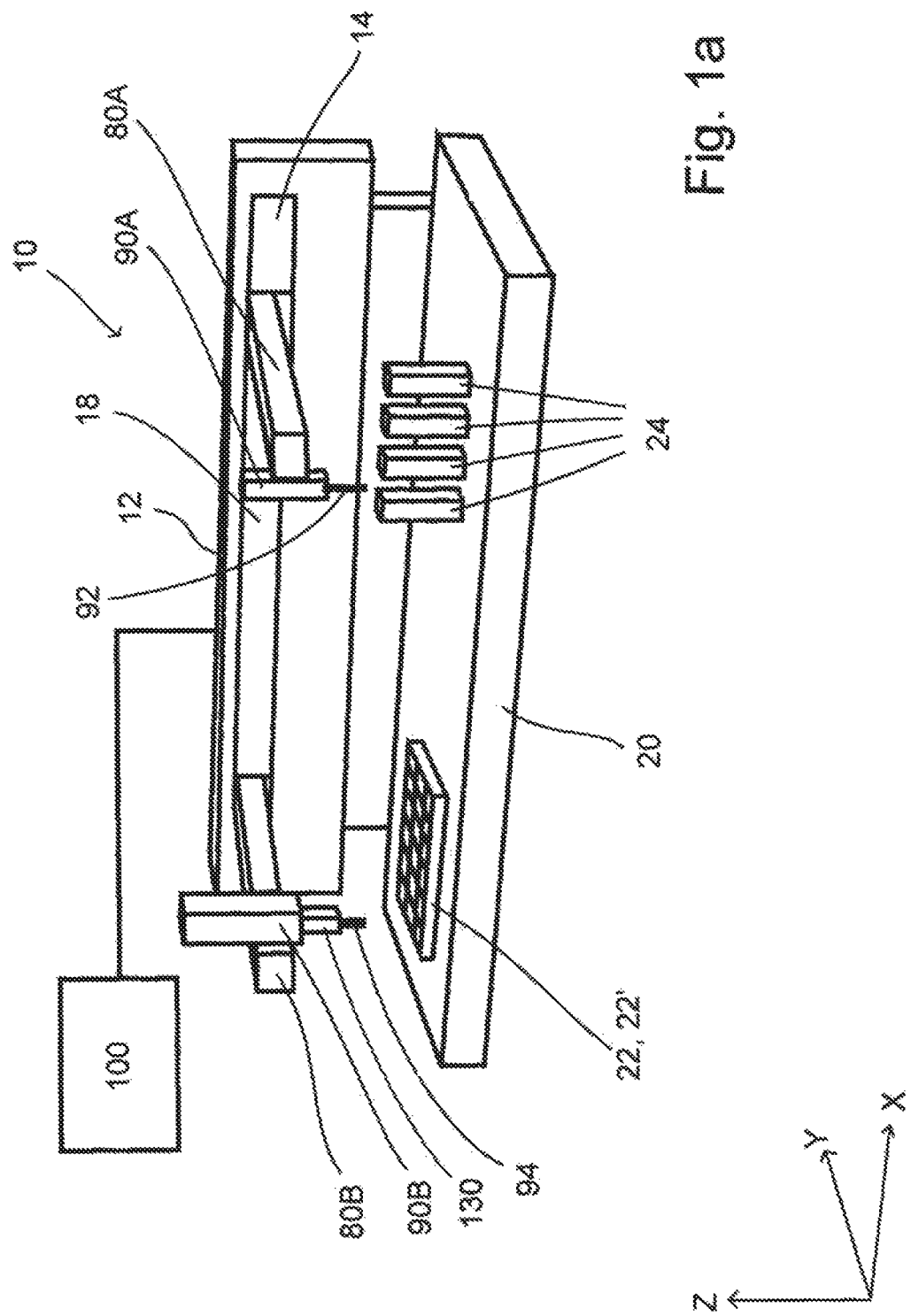

(58) Field of Classification Search
USPC .......................................................... 901/16
See application file for complete search history.

(56) References Cited

U.S. PATENT DOCUMENTS

| | | | |
|---|---|---|---|
| 8,511,664 B2 * | 8/2013 | Lambert | B25J 9/023 |
| | | | 269/60 |
| 2008/0064543 A1 | 3/2008 | Taguchi | |
| 2009/0155039 A1 | 6/2009 | Dujardn | |
| 2012/0152050 A1 * | 6/2012 | Richardson | B25J 9/023 |
| | | | 74/490.02 |
| 2016/0136886 A1 * | 5/2016 | Jeong | B25J 9/104 |
| | | | 425/375 |

FOREIGN PATENT DOCUMENTS

| | | |
|---|---|---|
| DE | 69112519 T2 | 5/1996 |
| EP | 1533073 B1 | 7/2006 |
| WO | 9637346 A1 | 11/1996 |
| WO | 9702931 A1 | 1/1997 |
| WO | 2015130243 A1 | 9/2015 |

* cited by examiner

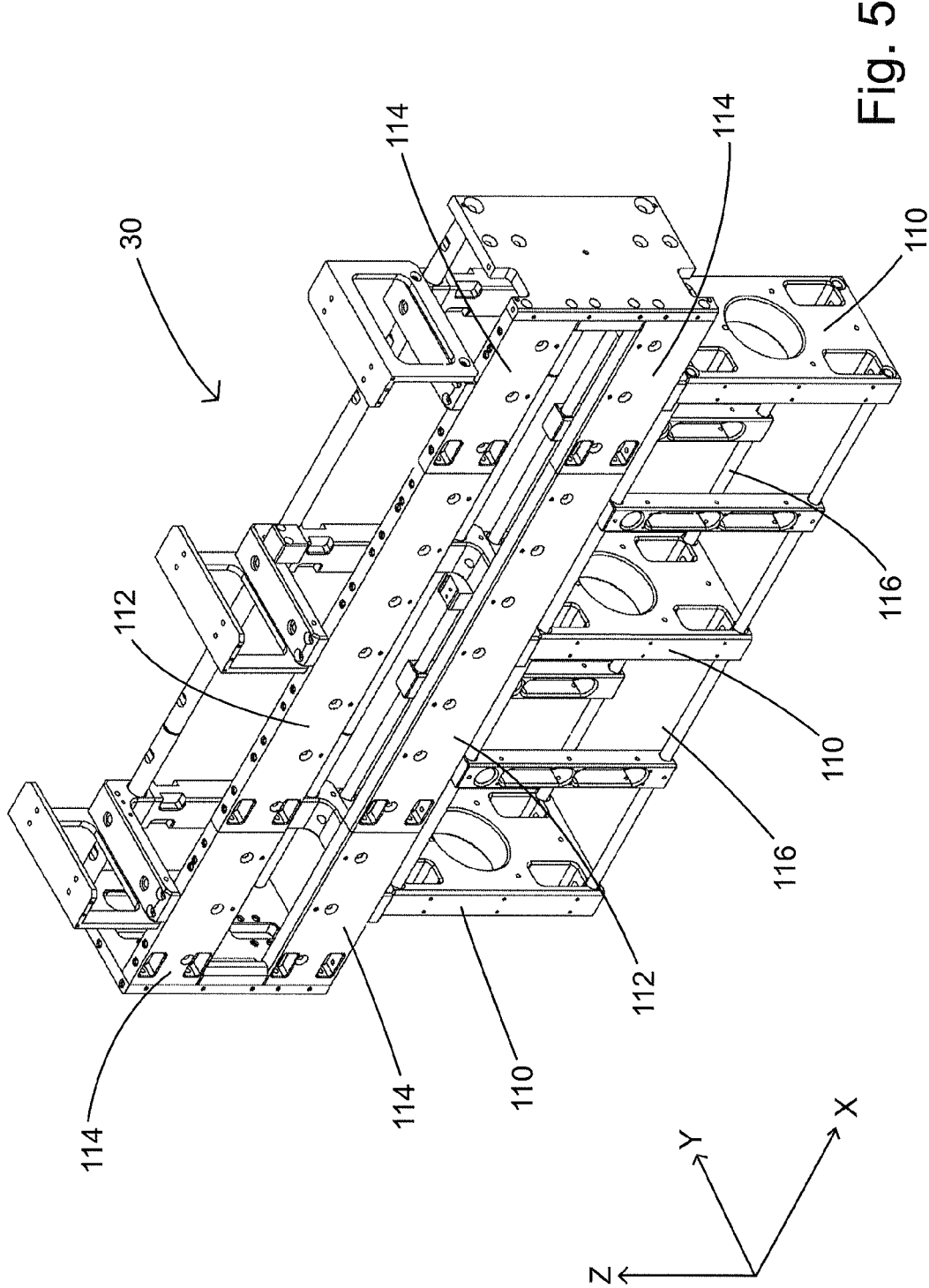

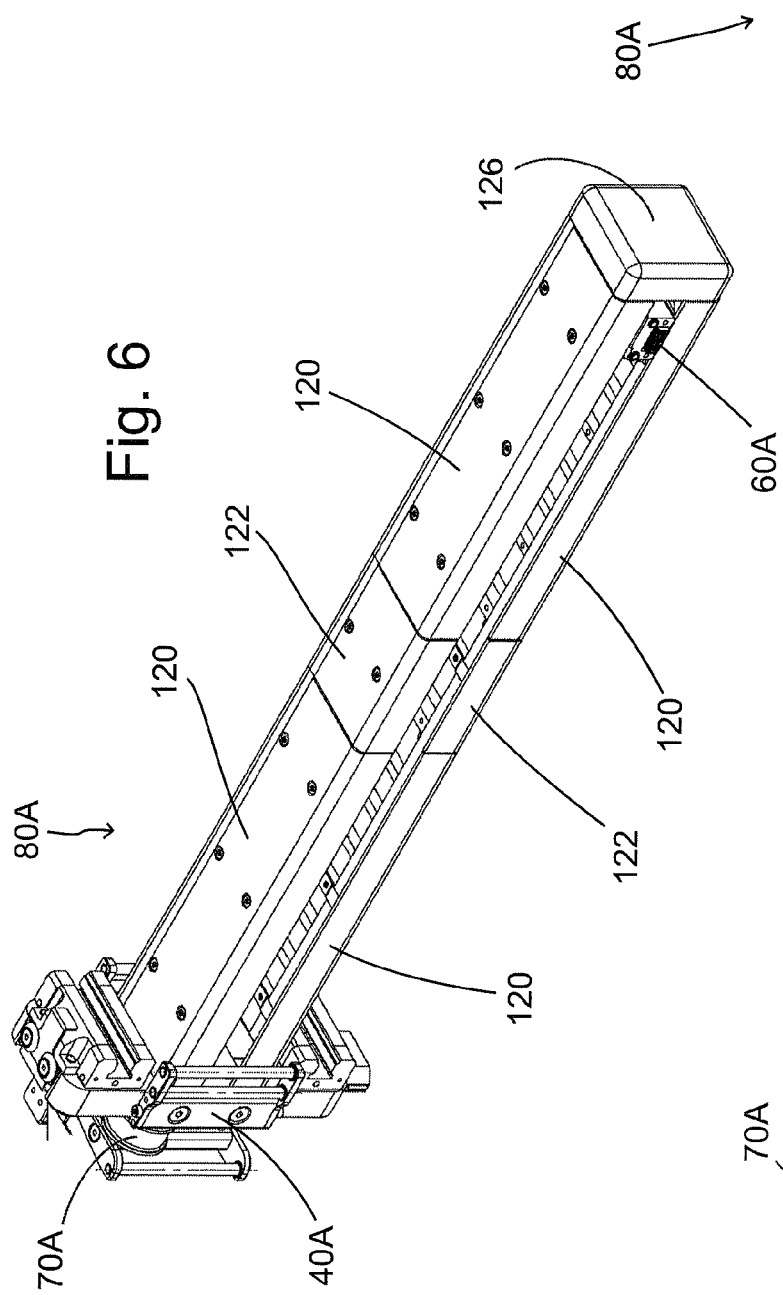
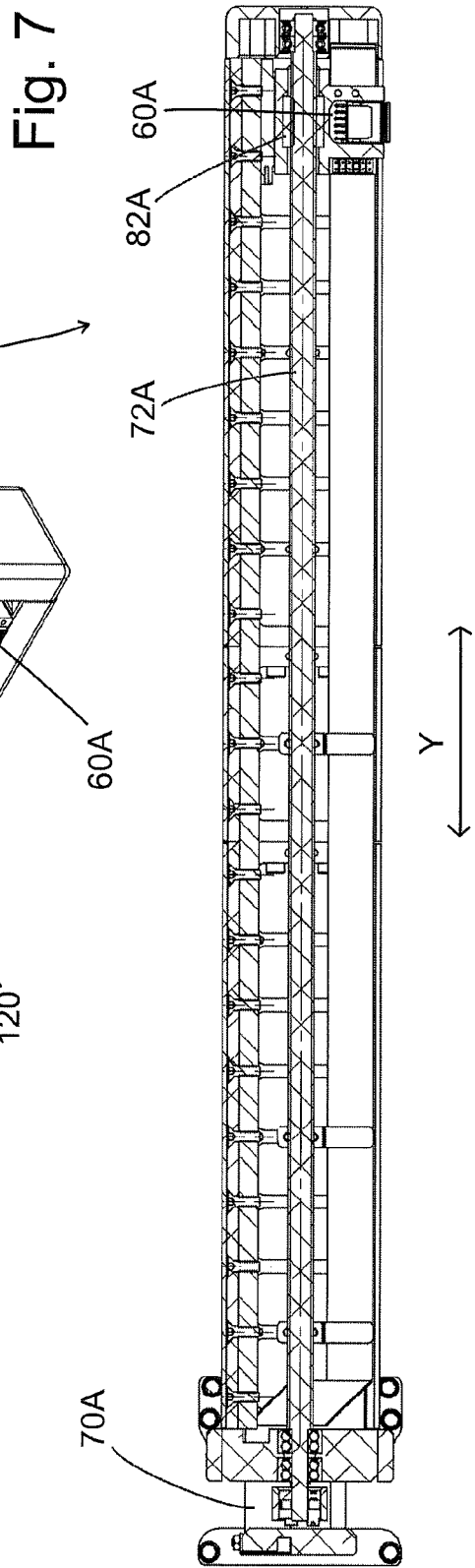

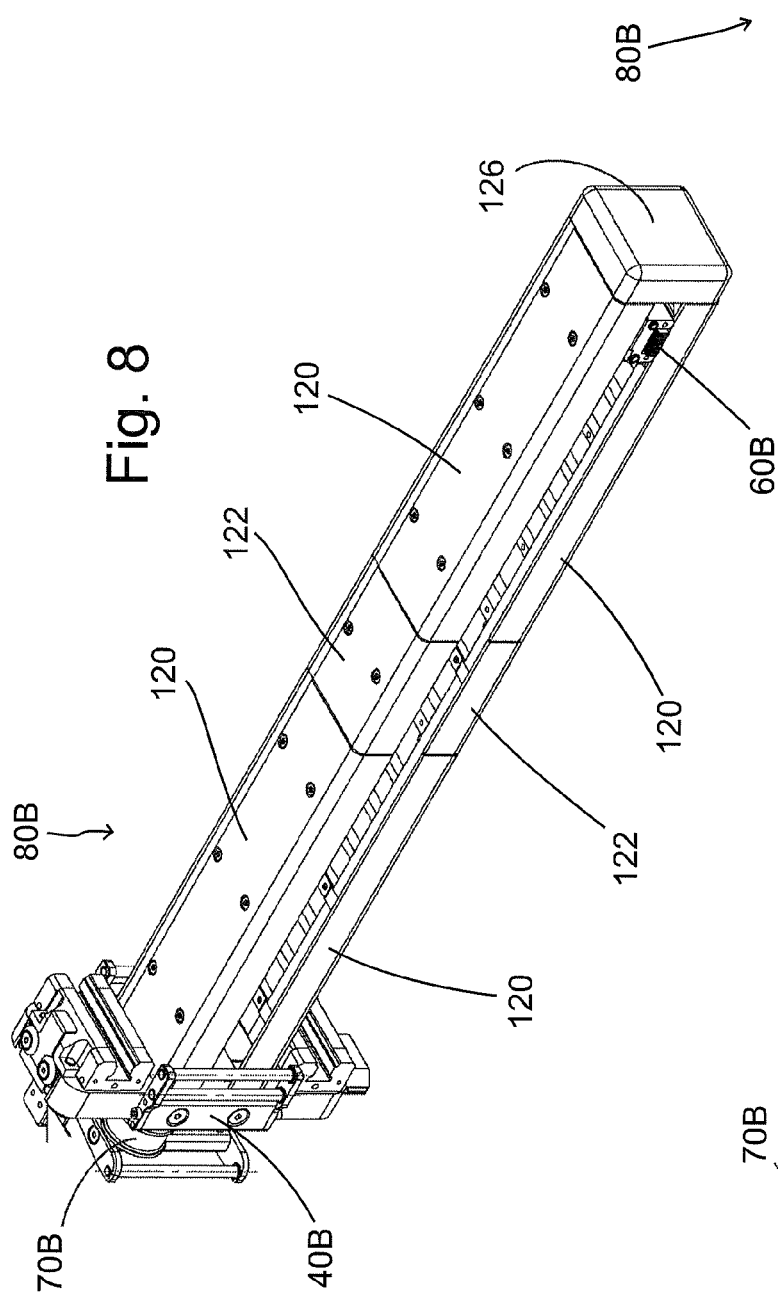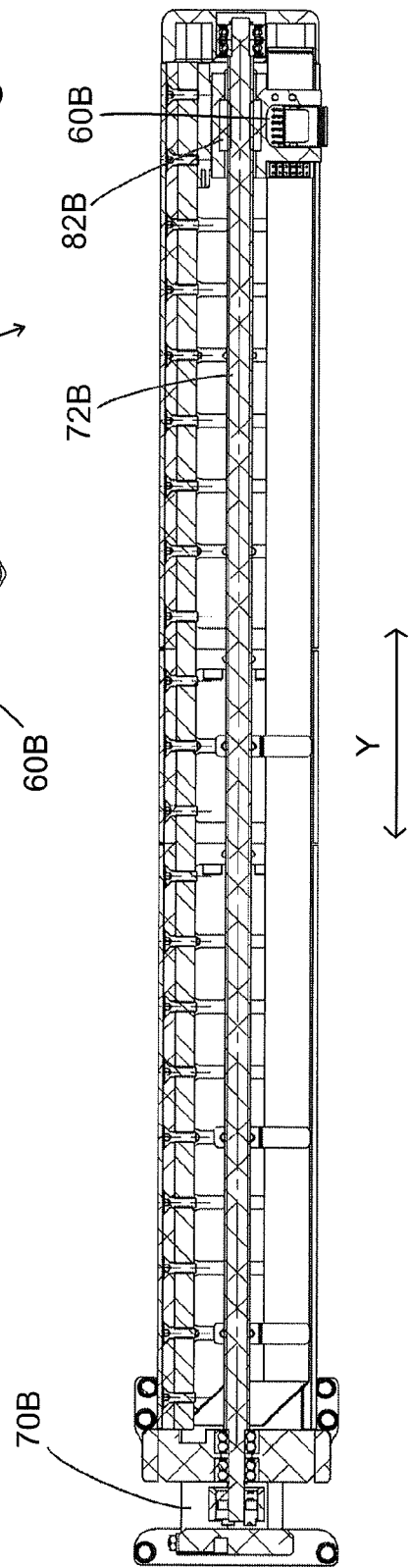

LIQUID HANDLING APPARATUS

RELATED APPLICATION

The present application is the national stage entry of international application no. PCT/EP2016/077395 filed Nov. 11, 2016 which claims priority to Application No. 10 2015 119 472.4 filed Nov. 11, 2015 which are both herein incorporated by reference.

FIELD

The present invention relates to a liquid handling apparatus for transferring liquid into or out of containers that are arranged in a substantially horizontal plane.

BACKGROUND

It is frequently necessary in laboratories in research and development and in production to introduce liquid amounts that can originate from different sources such as from liquid chromatographs into containers such as test tubes, microtiter plates, bottles, and the like, preferably in an automated manner, and also to remove such liquid amounts from then again in an automated manner. Liquid handling apparatus or liquid handling systems are used for this purpose.

The applicant inter alia manufactures liquid handling apparatus, so-called fraction collectors, for liquid chromatography in which the fractions resulting from the liquid chromatography are distributed in an automated manner in accordance with their creation and thus their chemical composition over different sample vessels that are preferably provided in the form of arrays in racks in the fraction collector. The sample vessels are positioned via these racks in at least one substantially horizontal plane in the fraction collector such that the individual sample vessels are traveled to by an output head and can be charged with the corresponding fraction. The traveling to the sample vessels takes place in a horizontal plane that is spanned by an X axis and by a Y axis standing perpendicular to the X axis and that is in parallel with the plane of the rack located in the fraction collector. The output head can then travel down in a vertical direction, i.e. in the Z axis, so that a tube that is arranged therein and that is connected to the liquid chromatograph via a hose travels into the corresponding sample vessel and introduces the fraction into it.

The positioning of the output head takes place via an X slide which is travelable in the direction of the X axis and at which an arm having a Y slide travelable in the direction of the Y axis is provided. A Z slide having the output head and travelable in the Z axis is arranged at this Y slide. The output head can thus travel to or into every sample vessel arranged in the plane spanned by the X axis and the Y axis.

The drive of the X slide takes place by an X drive motor via an X force transmission means in the form of a toothed belt and the drive of the Y slide takes place by a Y drive motor for driving the Y slide via a Y transmission means that can be a toothed belt or also a rotating spindle. The X drive motor is in a fixed position, whereas the Y drive motor is arranged at the Y slide taken along at the X axis and is moved along with it. The X drive motor together with the X force transmission means and the associated slide together with required guides, data and power cables as well as the Y drive motor with its data and power cables are accommodated in a parallelepiped-shaped housing that is generally located at the rear side of the liquid handling apparatus. Such an apparatus is e.g. known from EP 1 533 073 B1.

It has been found that this type of liquid handling apparatus such as is used for liquid chromatography can also be used in other sectors such as in preparative liquid handling systems in which liquids, that are also gel-like or pasty, but ultimately flowable substances, in the sense of the invention, can be introduced into containers from different sources, can be added in a metered manner, can be mixed in containers, and con be partly or completely removed from containers.

This extension of the application sector of the liquid handling apparatus has in the past already had the result that it has become necessary to adapt the dimensions of such an apparatus in a customized or application-specific manner. The applicant has previously designed its liquid handling apparatus as extensible in the direction of all axes for this purpose. Respective intermediate elements are for this purpose arranged in regions of the frame of the apparatus in which no drive components or the like are provided so then only extended guide rails and toothed belts or threaded spindles additionally have to be installed. It is also necessary to adapt the power and data lines of the Y drive motor taken along at the X slide to the changed dimensions. The longer the X axis is, the longer the power and data lines for the Y drive motor have to be. Apart from the fact that the taking along of the Y drive motor at the X slide has a disadvantageous effect on the dynamic behavior of the X slide, i.e. as a result of the increased mass of the X slide due to the Y drive motor, greater forces have to be exerted to accelerate and decelerate the X slide, provision must also be made that the power and data lines for the Y drive motor taken along by the X slide in particular do not impede other drive components in the construction space of the housing parallelepiped in the regions of the end positions of the X slide.

DE 39 26 670 A1 discloses a handling device having three fixed-position motors for moving a gripper in three spatial directions X, Y and Z. The drive of each axis takes place independently of the drive of the other axes via a belt drive for each axis. A decoupling of the movement of the Y and Z axes from the movement of the X axis takes place in that the motors of the Y and X axes drive their respective toothed belts via a square shaft that extends through the arm A so that the drive of the Y and Z axes can take place in the X direction independently of the position of the arm.

DE 42 00 923 A1 describes a biaxial linear drive in which fixed-position motors for the X and Y axes are provided. The movements of the X and Y axes are decoupled from one another. This is achieved in the same manner as in DE 39 26 670 A1 in that a first slide that travels in the X direction is displaceably supported in the X direction on a drive shaft that is provided for driving the slide in the Y direction.

DE 691 12 519 T2 describes a manipulator in which two fixed-position motors are provided, with the motor displacing a slide provided for the motion in the X direction via a ball screw in the X direction. The displacement of the manipulator in the Y direction takes place via a toothed belt that works in a manner released from the movement in the X direction.

US 2008/0064543 A1 relates to an apparatus having a triaxial drive for use inter alia in an automatic analysis apparatus. All the slides are driven in the three spatial directions via fixed-position motors. A belt drive is used for all the axes.

US 2009/0155039 A1 relates to a multiaxial robot. The drive of the tool carrier in the X and Y directions takes place only via belt drives, with an H-shaped extent of the belts being provided. The displacement of the tool in the X and Y directions takes place via an interplay of the rotational movements of pulleys so that a superposition of the X and Y movements is present.

WO 96/37346 discloses an apparatus for moving a working element in the X and Y directions. Its basic design corresponds to the H-shaped design described in connection with US 2009/0155039 having fixed-position drive motors and drive belts that run both in the X and in the Y directions.

WO 97/02931 discloses an apparatus comparable with the apparatus disclosed in WO 96/37346 A1 and US 2009/0155039. The basic design and the operating principle are the same.

It is therefore the underlying object of the invention to improve the drive for the Y slide.

SUMMARY

This object is satisfied by the features of the independent claims.

Further advantageous embodiments are set forth in the dependent claims.

The solution of the problem underlying the invention offers a number of advantages:

The moved mass of the arm traveling in the direction of the X axis is reduced so that the arm can be accelerated and decelerated faster or the motor performance of the X drive motor can be lower.

The weight saving at the Z slide via the Y drive motor being omitted there also makes it possible to expand the self-supporting length of the Y arm and thus to increase the working range of the liquid handling apparatus. It is also possible not to design the Y axis as self-supporting and to support it at its end opposite the X slide.

The number of different power and data lines for X drive motors and Y drive motors is reduced so that fewer preconfigured cables can be kept in stock for different dimensions of the liquid handling apparatus.

If an X slide and a Y slide are used, the X drive motor and the Y drive motor can be arranged in the same X-Z plane, whereby the depth of the housing in the Y direction is kept small.

If a second X slide and a second Y slide are additionally installed, the second X drive motor and the second Y drive motor can equally be arranged in the same X-Z plane, whereby the depth of the housing in the Y direction can be kept unchanged with respect to the design with only one X slide and one Y slide.

The same stepped motors having the same drive components for transmitting the rotational movement to their associated toothed belts can be used as the X drive motor and as the Y drive motor, which reduces the number of different components to be kept available.

The liquid handling apparatus can have a base carrier on which not only the apparatus itself is set up, but rather also the containers are arranged individually or in racks or individually in part and in racks in part. Containers in the sense of the invention are to be understood as all vessels that can accept liquids of any kind such as test tubes, vials, bottles, glasses, flasks, cylinders, microtiter plates and the like. Vessels of different kinds and sizes can be simultaneously arranged in the X-Y plane and can be operated by the working head or heads; for example, samples can be taken from a smaller or larger vessel and can be placed in a larger or smaller vessel or a vessel of the same size since the apparatus in accordance with the invention makes it possible to travel to any desired coordinates in the X-Y plane or in the X-Y-Z space.

The base carrier can be present in the form of a plate, for instance of a table plate or a bowl, or it can be a grid-like structure so that containers placed on the base carrier are also accessible from below, for instance to be able to write and read containers provided with RFID tags from below such as is described in EP-A 14 186 176.5 of the applicant. The liquid handling apparatus can be mounted on the base carrier or can be set up separately therefrom. It is also possible to fasten the liquid handling apparatus to a wall or to a room ceiling, optionally suspended, and to provide the base carrier fixedly or movably in the region that can be traveled to by the X slide and the Y slide. The base carrier can be completely or partially replaced with a conveying device such as a conveyor, a roller conveyor belt, a trolley or a turntable.

The space-saving manner of construction of the liquid handling apparatus makes possible the simultaneous use of two Y slides of which each provided at its own arm, with each arm being attached to its own X slide. Two Z slides are attached to each Y slide to respectively carry out one of the following tasks sequentially or simultaneously via different task-specific working heads provided thereat: autosampling, sample introduction/sample extraction, aliquot introduction/aliquot extraction, fraction collection/fraction removal/fraction pooling, container flushing, sucking off of flushing liquid, container cleaning. Up to four different worksteps can thus be carried out sequentially or simultaneously by one and the same apparatus using the sample vessels. Each working head can here travel to each container disposed in the range of action of the apparatus. Any optionally required collision protection is provided at the software side.

DRAWINGS

Figure 1B:
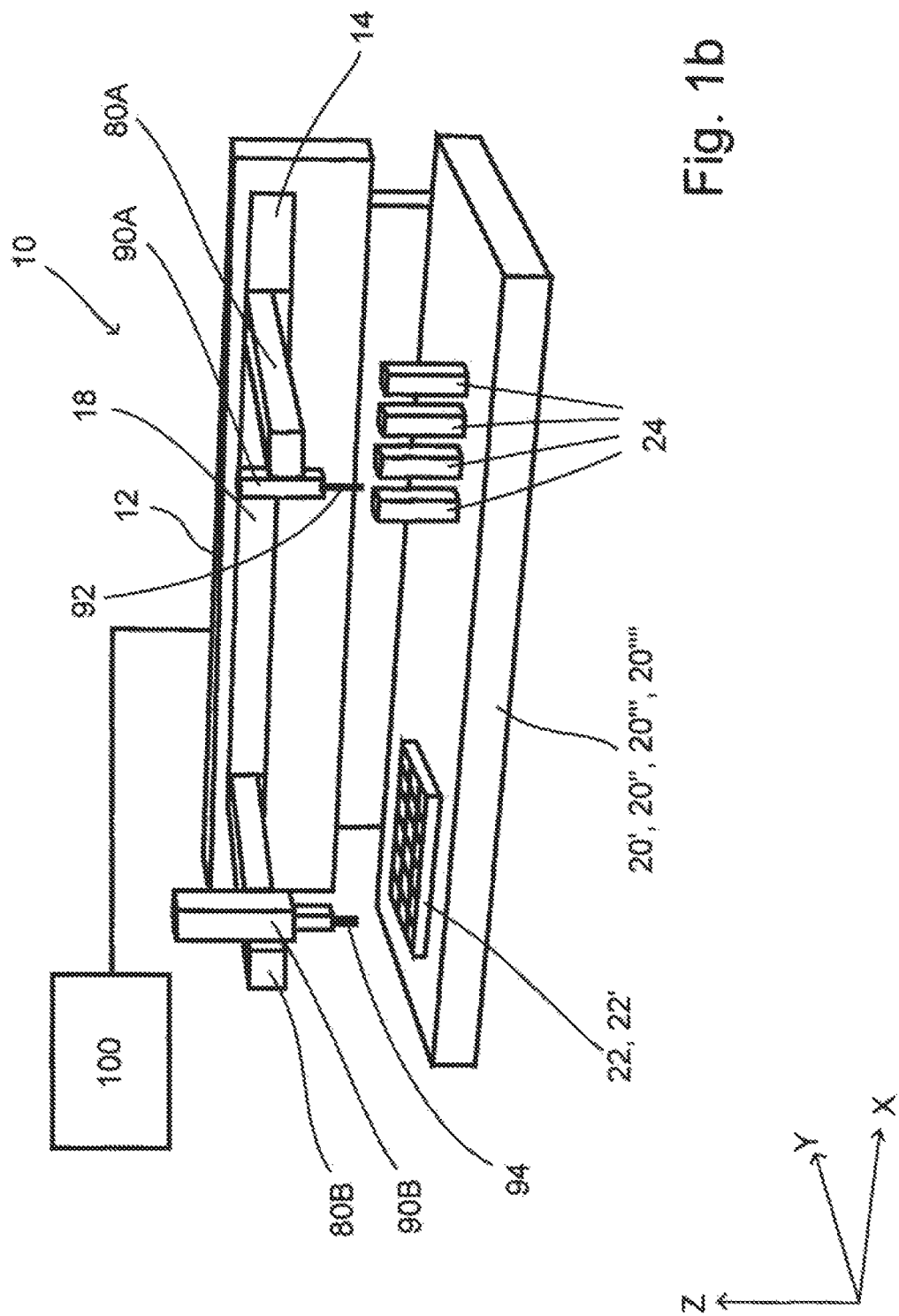
Figure 2:
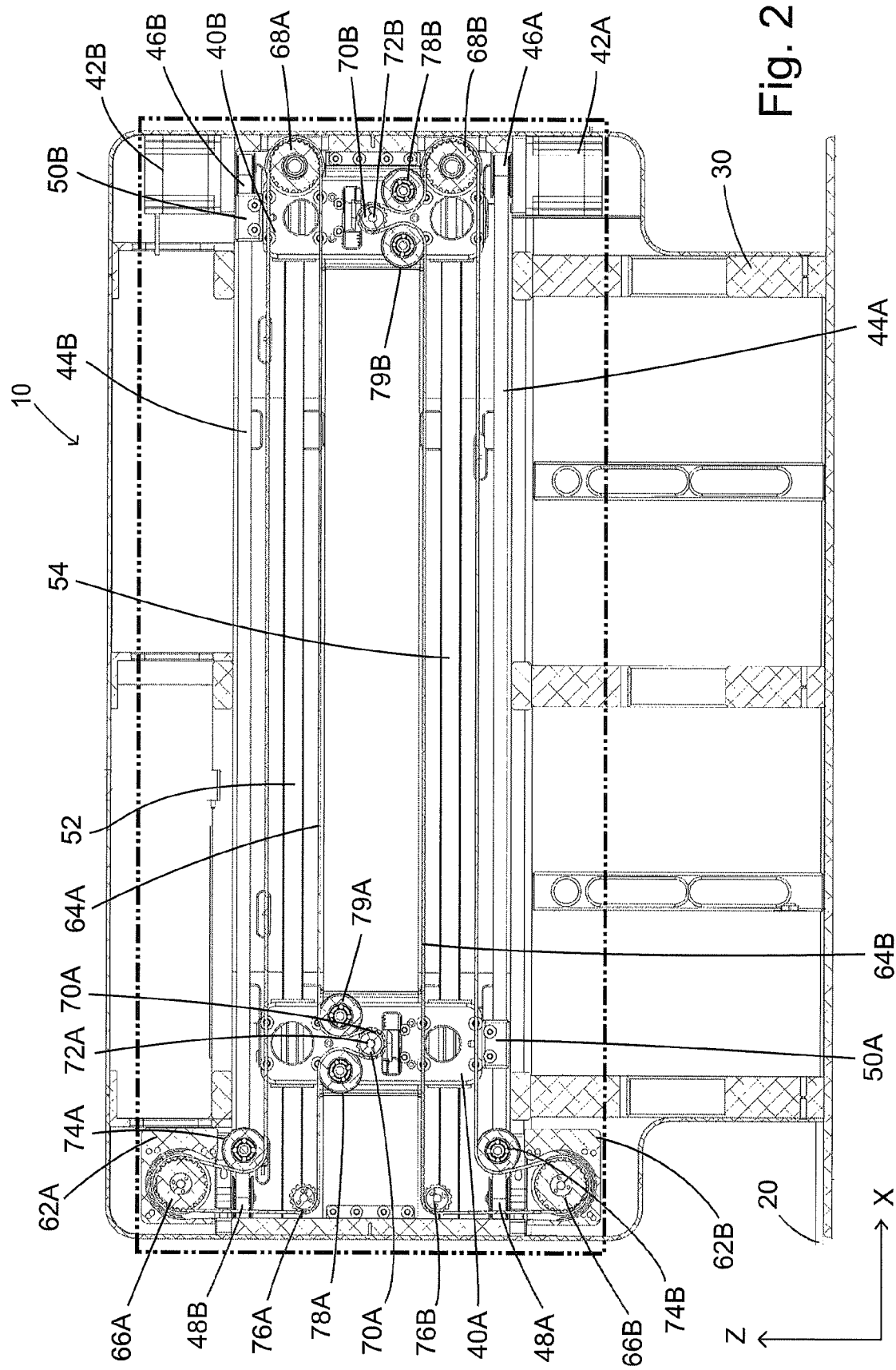
Figure 3:
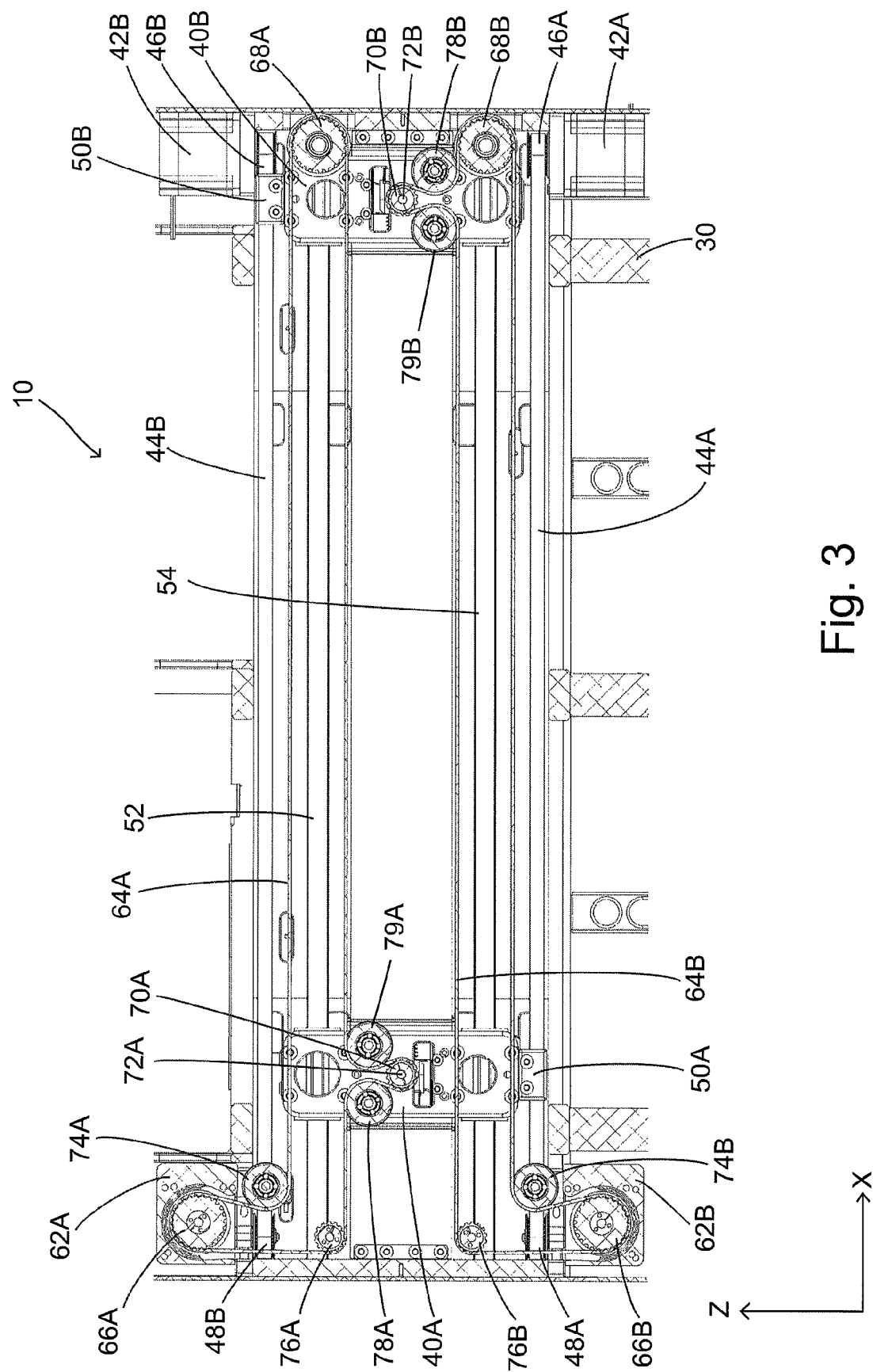
Figure 4:
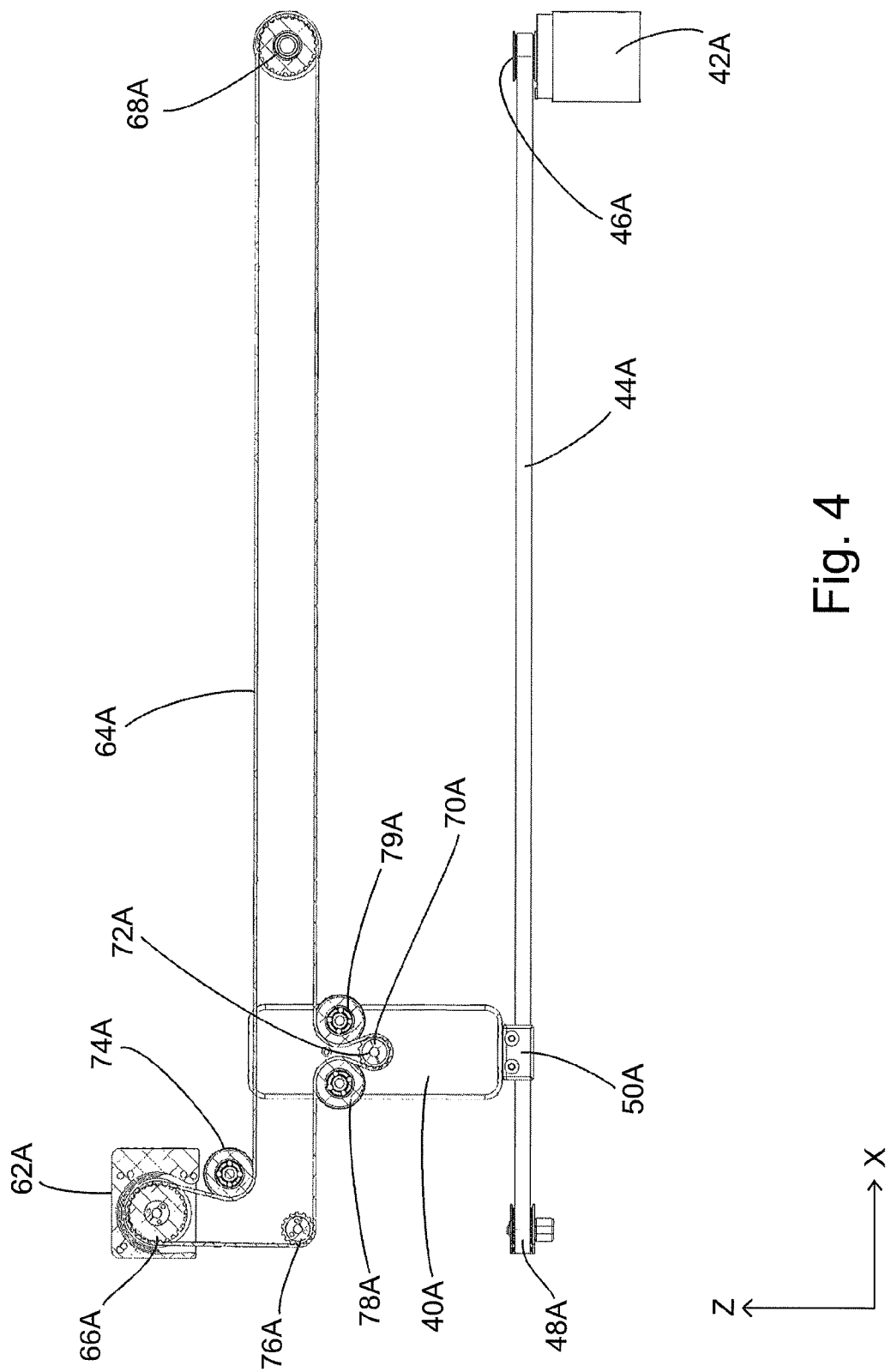

The invention will be described by way of example in the following with reference to the drawings, in which there are shown:

FIGS. 1a and 1b a schematic perspective view of a liquid handling apparatus in accordance with the invention;

FIG. 2 a view from the rear of the liquid handling apparatus with a removed housing;

FIG. 3 a detail of FIG. 2 that shows the arrangement of the components used for the drive of two X slides and two Y slides in more detail;

FIG. 4 schematically, the drive principle of an X slide and of its associated Y slide;

FIG. 5 a perspective view of a basic framework of the liquid handling apparatus without slides and drive components;

FIGS. 6 and 8 a perspective view of an X slide with a Y slide attached thereto via an arm; and FIGS. 7 and 9 a side view of the X slide with a Y slide attached thereto via an arm of FIG. 6.

DETAILED DESCRIPTION

FIG. 1 is a purely schematic perspective view of a liquid handling apparatus 10 in accordance with the invention that is attached to a base carrier 20 formed as a plate on which containers are located in the form of a microtiter plate 22, a rack 22', and of bottles 24 again indicated purely schematically as parallelepipeds. The plate 10 extends horizontally in an X-Y plane spanned by an X axis and Y axis. A substantially parallelepiped-shaped housing 12 extends vertically in an X-Z plane at the rear of the base carrier.

Two X slides 40A, 40B at which a respective arm 80A, 80B is arranged that extends horizontally in the Y direction through a slit 14 in the housing 12 and which are travelable in the X direction are provided in the housing 12. The slit 14 in the housing 12 is closed by a band 18 in a manner that is described in detail in EP 1 533 073 B1.

A Y slide 60A, 60B (not visible in FIGS. 1a and 1b, cf. FIGS. 6-9) at which a respective working head 90A, 90B is provided is displaceably arranged at each arm 80A, 80B. Each working head 90A, 90B has its own Z slide 130 and its own Z drive motor for the drive in the Z direction and supports a task-specific apparatus such as a pipette tube 92 or a suction apparatus 94. The cables and hoses required for the supply of the Z drive motor and of the working heads 90A, 90B are not shown in FIG. 1. The working heads 90A, 90B are additional apparatus that are commercially available in this present case and that are not a subject matter of the invention. "Electrical mini slides EGSL" available from the Festo corporation can be used, for example.

In addition, all the guide and drive components required for the two X slides 40A 40B as well as some of the guide and drive components required for the Y slides 60A, 60B, i.e. in particular the drive motors with drive rollers, guide pulleys, and toothed belts, are located in the parallelepiped-shaped housing 12 as will be described in detail in the following. The data and power lines required for the drive motors, the motor control circuits, the transformer and possibly necessary sensor systems, such as limit switches, with associated cabling are likewise located in the housing 12.

The control of the total apparatus takes place via a schematically shown control device 100 that can likewise be provided in the housing 12, but can also equally well be provided installed as a separate device at the housing 12 or in a free-standing manner and can be wirelessly connected or connected in a wired manner to the components to be controlled.

FIG. 2 is a view from the rear of the liquid handling apparatus 10 with a removed housing 12. The cross-hatched regions represent the basic framework 30 of the liquid handling apparatus that is reproduced again in an individual perspective view in FIG. 5. The two X slides 40A, 40B on two guide rails 52, 54 are located in the region framed by chain dotted lines as are belt drives 42A, 42B, 44A, 44B required for the drive of the X slides 40A, 40B and Y slides 60A, 60B, rollers 46A, 46B, 48A, 48B, 66A, 66B, 68A, 68B, 70A, 70B, 72A, 72B, 74A, 74B, 76A, 76B, 78A, 79A, 78B, 79B, and X drive motors 42A, 42B and Y drive motors 62A, 62B whose arrangement will be described in more detail with reference to FIG. 3.

FIG. 3 shows the section of FIG. 2 defined by the region framed by chain dotted lines and will be used for a detailed description of the location of the individual components. The X slide 40A is arranged displaceable on two guide rails 52, 54 and is clamped via a belt clamp 50A to an X drive belt 44A formed as a toothed belt. The X drive belt 44A is driven via an X drive motor 42a via an X drive roller 46A and via an X guide pulley 48A. The drive axles of the X drive roller 46A and of the X guide pulley 48A extend in the Z direction so that the loop of the X drive belt 44A is disposed in the horizontal X-Y plane.

The Y slide 60A that cannot be seen in FIG. 3, but can be seen in FIGS. 6-9, is driven via a rotating spindle such as a ball screw whose Y spindle 72A is provided at its end at the X slide 40A with a Y output roller 70A that can be seen at the front side at the center of the X slide. A Y drive belt 64A formed as a toothed belt is placed over approximately three quarters of the circumference of the Y output roller 70A via two Y wraparound rollers 78A, 79A. The Y drive belt 64A is further driven about a Y angle guide pulley 76A, a Y drive roller 66A that is driven via a Y drive motor 62A, a Y belt pulley 4A, and a Y end guide pulley 68A. The loop of the Y drive belt 64A is thus disposed in the vertical X-Z plane and thus stands perpendicular to the loop of the X drive belt 44A.

For example, the X slide 40A arranged at the left in FIG. 3 is driven via the drive belt 44A shown at the bottom in FIG. 3 by means of the X drive motor 42A arranged in a fixed position at the bottom right, while the Y slide 60A is driven via the Y drive belt 64A shown at the top in FIG. 3 by means of the Y drive motor 63A arranged in a fixed position at the top left. How the drive works in detail will be explained further below with reference to FIG. 4.

The second X slide 40B is likewise arranged displaceable on the two guide rails 52, 54 and is clamped via a second belt clamp 50B to a second X drive belt 44B. The second X drive belt 44B is driven via a second X drive motor 42B via a second drive roller 46B and is deflected via a second X guide pulley 48B. The drive axes of the second X drive roller 46B and of the second X guide pulley 48B extend in the Z direction so that the loop of the second X drive belt 44B is disposed in the horizontal X-Y plane in parallel with the loop of the first X drive belt 44A.

The second Y slide 60B that can likewise not be seen in FIG. 3, but corresponds in function and construction to that of FIGS. 6 and 7, but is arranged facing the Y slide 60A, is driven via a second ball screw whose Y spindle 72B is provided at its end at the second X slide 40B with a second Y output roller 70B that can be seen at the front side at the center of the second X slide. A second Y drive belt 64B is placed around approximately three-quarters of the circumference of the second Y output roller 70B via two further Y wraparound rollers 78B, 79B. The second Y drive belt 64B is furthermore wrapped around a second Y angle guide pulley 76B, a second Y drive roller 66B, that is driven via a second Y drive motor 62B, a second Y belt pulley 74B, and a second Y end guide pulley 68B. The loop of the second Y drive belt 64B is thus disposed in the vertical X-Z plane and therefore stands perpendicular to the loop of the first X drive belt 44A and of the second X drive belt 44B and is in parallel with the loop of the first Y drive belt 64A. The second X slide 40B arranged at the right in FIG. 3 is driven via the second X drive belt 44B shown at the top in FIG. 3 by means of the second X drive motor 42B arranged at the top right, while the second Y slide 60B is driven via the second Y drive belt 64B shown at the bottom in FIG. 3 by means of the second Y drive motor 63B arranged at the bottom left.

The drive for the second X slide 40B and for the Y slide 60B carried by it via the second arm 80B is thus in principle identical to the drive for the first X slide 40A and for the first Y slide 60A carried by it via the first Y arm 80A, but rotated by 180 degrees. In other words, the components that serve for the drive of the X slide 40A and of the Y slide 60A are disposed in mirror image to the components that serve for the drive of the second X slide 40B and of the second Y drive 60B, with the mirror axis running through the centers of the two Y drive rollers 70A, 70B. All the drive motors for the X slides 40A 40B and of the Y slides 60A, 60B are in fixed positions.

The operation of the drive of an X slide, of the X slide 40A, and of its associated slide 46A will now be explained with reference to FIG. 4 in conjunction with FIG. 7. The components important for the drive have been extracted from FIG. 3 in FIG. 4; however, guides and holders and drive components for the second X slide 40B and for its associated Y slide 46B have been omitted.

The X drive motor 42A dries the drive belt 44A looped around the X drive roller 46A and around the X guide pulley 48A, whereby the X slide clamped via the belt clamp 50A to the X drive belt 44A is moved to the left or right in the X direction depending on the direction of rotation of the X drive motor 42A.

When the Y drive motor 62A has no current applied, the Y drive belt 64A is taken along via the output roller 70A, whereby the output roller 70A is rotated. This rotation is transmitted to the Y spindle 72A connected to the output roller 70A. As is shown in FIG. 7, the Y slide 60A is displaceably guided in the Y direction at the arm 80A. An internal thread matching the Y spindle 72A is formed at the Y slide 60A or a component having an internal thread is attached that represents the nut element 82 for a rotating spindle drive. Since the nut element 82A is rotationally fixed, it is forced to move to the left or to the right in the Y direction in dependence on the direction of rotation of the Y spindle 72A with a rotating Y spindle 72A, whereby the Y slide 60A also moves accordingly. The pitch of the Y spindle is here preferably adapted such that the Y slide 60A is also moved over its total travel path in the Y direction when the X slide 40A moves over its total travel path in the X direction. The travel movement of the Y slide 60A is thus coupled to the travel movement of the X slide 40A.

It will now again be explained with reference to FIG. 4 how the desired travel movement of the Y slide 60A independent of the travel movement of the X slide 40A can be maintained. If the Y drive motor 62A is switched on, it in turn drives the Y drive belt 64A. Depending on the direction of rotation of the Y drive motor 62A, the rotation effected by the Y drive motor 62A at the Y output roller 70A is additively or subtractively superposed on the rotation at the Y output roller 70A caused by the taking along of the X slide via the X drive motor 62A and the X drive belt 44A.

Some special positioning cases for the Y slide 60A will now be looked at for illustration. The movement of the Y slide 60A with a stationary Y drive motor has already been explained above. If the spindle pitch is adapted to match the travel path of the X slide 60A, the Y slide 60A travels over its total travel path in the Y direction during the passage of the X slide 40A over its total travel path in the X direction so that the Y slide travels a diagonal over the X-Y plane whose coordinates can generally be traveled to due to the dimensions of the liquid handling apparatus.

With a stationary X drive motor 42A, only the Y drive motor 62A acts via the Y drive belt 64A on the Y drive roller 70A and thus on the Y spindle 72A so that the Y slide 60A only travels in the Y direction, and indeed to the left or to the right in dependence on the rotational direction of the Y drive motor 62A when looking from the Z axis toward the arm 80A with the Y slide 60A.

To achieve a travel of the Y slide 60A only in the X direction, the Y drive motor 62A and, via its Y drive belt, the Y drive roller 70A and thus the Y spindle 72A are set into rotation such that a counter-rotation is subtractively superposed on the rotation at the Y output roller 70A caused by the taking along of the X slide via the X drive motor 62A and the X drive belt 44A so that the two rotational movements cancel one another at the Y spindle 72A and the latter does not rotate and the Y slide 60A thus does not move in the Y direction.

Any desired combination of superposition of the two rotational movements at the Y output roller 70A and thus of the Y spindle 20A is possible between these extreme cases of stationary X drive motor 42A and rotating Y drive motor 62A and rotating X drive motor 42A and stationary Y drive motor 62A so that any coordinate generally accessible on the X-Y plane of the base carrier 20 can be traveled to by the Y slide 60A and thus by a working head 90A attached thereto.

FIG. 5 shows a perspective view of a basic framework 30 of the liquid handling apparatus 10 without slides and drive components and the like. It can, however, be recognized that the basic framework 30 is made up of similar vertical support columns 110 arranged in row shape in the X direction and of similar transversely extending plate elements 114 or plate elements 112 and bar elements 116. The basic framework is thus extensible by elements of the above types or is also shortenable by a removal of elements, whereby a modular design is achieved that permits a customized or application-specific size adaptation of the liquid handling apparatus 10 in the X direction. Depending on the length of the apparatus 10 in the X direction, different belt lengths for the X drive belts 44A, 44B and for the Y drive belts 64A, 64B and optionally different cable lengths for motors now have to be provided, but with the same respective cables being able to be used for the two X drive motors 42A, 42B and the two Y drive motors 62A, 62B.

FIGS. 6 and 8 show a perspective view of an X slide 40A with a Y slide 60A attached thereto via an arm 80A. The Y spindle 72A is covered by plate elements 120, 122, 126 in this view. It can be seen that the arm 80A for the Y axis is also of a modular design and can be extended or shortened respectively by interposition of further plate elements 120, 122 or by removing plate elements 120 122. Then only a Y spindle having a suitable length has to be provided.

It must furthermore be stated that the arrangement shown in FIG. 6 in which the Y slide 60A is arranged at a side of the arm 80A can be modified such that the slide 60A is located on the oppositely disposed side of the arm 80A or also at the lower side of the arm 80A. This can be expedient when space problems with further Z axes possibly occur on the presence of a second arm 80B. The flexibility of the liquid handling apparatus 10 is thus further increased.

FIGS. 7 and 9 show a side view of the X slide 40A with the Y slide 60A of FIG. 6 attached thereto via the arm 80A. The Y spindle 72A can also be seen at whose left end the Y output roller 70 is arranged and at whose right end the Y slide 60A with the nut element 82A is located.

One or two Z slides can be arranged at each Y slide 60A, 60B and permit different working heads 90A, 90B to be installed that can be provided with different devices to be able to carry out different worksteps. The Y slide 60A can thus e.g. be provided at the arm 80A with two working heads 90A that each have a pipette tube of which one is used to extract liquid from a container and to add it to another, such as on an aliquot extraction and an aliquot introduction and of which the other is used to extract liquid from a container and to distribute it over other containers, while the Y slide 60B is provided at the other arm 80B with a working head 90B that permits flushing processes of containers to be carried out in situ. It is understood that in the event that working heads 90A are provided for different purposes at a single slide 80A, they can then be taken into use after one another in time, while working heads 90A, 90B at different Y slides 60A, 60B at different arms 80A, 80B can by all means be used simultaneously. The control for this and also the collision avoidance is the responsibility of the control device 100.

This is only one example for numerous combinations of work procedures that can be considered and that can be carried out with the liquid handling apparatus in accordance with the invention.

REFERENCE NUMERAL LIST 10 liquid handling apparatus
12 housing
14 slit
18 band
20 base carrier
22 container, microtiter plate
22' rack
24 container, bottle
30 basic framework
40A, 40B X slide, second X slide
42A, 42B X drive motor, second X drive motor
44A, 44B X drive belt, second X drive belt
46A, 46B X drive roller, second X drive roller
48A, 48B X guide roller, second X guide roller
50A, 50B belt clamp, second belt clamp
52 guide rail
54 guide rail
60A, 60B Y slide, second Y slide
62A, 62B Y drive motor, second Y drive motor
64A, 64B Y drive belt, second Y drive belt
66A, 66B Y driver roller, second Y drive roller
68A, 68B Y end guide roller, second Y end guide roller
70A, 70B Y output roller, second Y output roller
72A, 72B Y spindle, second Y spindle
74A, 74B Y belt pulley, second Y belt pulley
76A, 76B Y angle guide pulley, second Y angle guide pulley
78A, 79A, Y wraparound roller
78B, 79B second Y wraparound roller
80A, 80B arm, second arm
82A, 82B nut element, second nut element
90A, 90B working head, second working head
92 pipette tube
94 suction apparatus
100 control device
110 support column
112, 114 plate elements
116 bar elements
120, 122 plate elements
126 plate element

The invention claimed is:

1. A liquid handling apparatus for transferring liquid into and out of containers that are arranged in a space defined by a substantially horizontal plane including an X axis and a Y axis perpendicular to the X axis, and a Z axis standing perpendicular to the substantially horizontal plane, the liquid handling apparatus comprising:
an X slide which is travelable in the direction of the X axis and at which a first arm is provided which has a Y slide travelable in the direction of the Y axis and which is optionally configured for attaching at least one Z slide travelable in the Z axis;
an X drive motor for driving the X slide via an X force transmission means and a Y drive motor for driving the Y slide via a Y force transmission means, wherein both the X drive motor and the Y drive motor are in fixed positions;
wherein the Y force transmission means is coupled to the X slide such that a travel movement of the X slide imparts a travel movement to the Y slide; and such that a further travel movement can be superposed on the Y slide via the Y drive motor such that any desired position of the Y slide can be reached,
wherein the X force transmission means comprises an X drive belt looped around an X drive roller and around an X guide pulley, whereby the X slide is clamped via a belt clamp to the X drive belt and is moved to the left or right in the X direction depending on the direction of rotation of the X drive motor; wherein the Y force transmission means comprises a Y drive belt and a rotating Y spindle, whereby, when the Y drive motor has no current applied, the Y drive belt is taken along via an output roller, whereby the output roller is rotated and whereby rotation of the output roller is transmitted to the Y spindle connected to the output roller;
wherein the Y slide is displaceably guided in the Y direction at the first arm;
wherein an internal thread matching the Y spindle is formed at the Y slide or a component having an internal thread is attached that represents a nut element for a rotating spindle drive; and
wherein, since the nut element is rotationally fixed, it is forced to move in the Y direction in dependence on the rotation of the Y spindle, whereby the Y slide also moves accordingly.

2. The liquid handling apparatus in accordance with claim 1, wherein the X force transmission means comprises a toothed belt.

3. The liquid handling apparatus in accordance with claim 1, wherein the Y force transmission means comprises a toothed belt.

4. The liquid handling apparatus in accordance with claim 1, further comprising:
a second X slide which is travelable in the direction of the X axis and at which a second arm is provided which has a second Y slide travelable in the direction of the Y axis and which is optionally configured for attaching at least one second Z slide travelable in the direction of the Z axis; and
a second X drive motor for driving the second X slide via a second X force transmission means and a second Y drive motor for driving the second Y slide via a second Y force transmission means.

5. The liquid handling apparatus in accordance with claim 4, wherein the second X force transmission means comprises a belt and the second Y force transmission means comprises a belt and a rotating spindle.

6. The liquid handling apparatus in accordance with claim 1, wherein the second Y force transmission means is coupled to a second X slide such that a travel movement of the second X slide imparts a travel movement to a second Y slide; and such that a further travel movement can be superposed on the second Y slide via the second Y drive motor such that any desired position of the second Y slide can be reached.

7. The liquid handling apparatus in accordance with claim 1, wherein X drive motor and the Y drive motor are arranged in a substantially vertical plane spanned by the X axis and by the Z axis.

8. The liquid handling apparatus in accordance with claim 1, wherein the belt of each X force transmission means rotates in a horizontal plane substantially perpendicular to the belt of each Y force transmission means.

9. The liquid handling apparatus in accordance with claim 1, wherein the first arm is supported on a first end by a housing.

10. The liquid handling apparatus in accordance with claim 1, wherein dimensions of the liquid handling apparatus are adapted in a customized or application-specific manner in at least one of the X direction, the Y direction and the Z direction by modular intermediate elements.

11. The liquid handling apparatus in accordance with claim 10, wherein the dimensions of the liquid handling apparatus can be extended up to 3 m in the X direction, up to 1 m in the Y direction, and up to 1 m in the Z direction.

12. The liquid handling apparatus in accordance with claim 1, wherein the liquid handling apparatus has a base carrier on which the liquid handling apparatus and the containers are arranged, and wherein the containers are arranged in one of an individual manner, in racks, and each of the individual manner and in racks.

13. The liquid handling apparatus in accordance with claim 1, wherein the liquid handling apparatus has a base carrier that is smaller than or the same size as the region on the X-Y plane that can be traveled to by the X slide and the Y slide and on which the containers are arranged individually or in racks or individually in part and in racks in part.

14. The liquid handling apparatus in accordance with claim 1, wherein the liquid handling apparatus has a base carrier that is replaced in the region on the X-Y plane that can be traveled to by the X slide and the Y slide at least partly with a conveying device.

15. The liquid handling apparatus in accordance with claim 14, wherein the conveying device comprises one of a conveyor, a roller conveyor belt, a trolley, and a turntable.

16. The liquid handling apparatus in accordance with claim 1, wherein the liquid handling apparatus is configured for wall installation or ceiling installation and the region on the X-Y plane that can be traveled to by the X slide and the Y slide is at least regionally charged with containers via a conveying device.

17. The liquid handling apparatus in accordance with claim 16, wherein the conveyor device is one of a conveyor, a roller conveyor belt, a trolley, and a turntable.

18. The liquid handling apparatus in accordance with claim 1, wherein one of at least one Z slide and two Z slides that each carries a task-specific working head is arranged at each Y slide.

19. The liquid handling apparatus in accordance with claim 18, wherein each task-specific working head can be configured for carrying out one of the following tasks: autosampling, sample introduction/sample extraction, aliquot introduction/aliquot extraction, fraction collection/fraction removal/fraction pooling, container flushing, sucking off of flushing liquid, container cleaning.

20. The liquid handling apparatus in accordance with claim 18, wherein the task-specific working heads are capable of satisfying different tasks simultaneously and sequentially.

21. The liquid handling apparatus in accordance with claim 1 having a second X slide positionable positionable independently of the X slide in the X direction, wherein one or each X slide carries a respective arm that extends in the Y direction and that in turn has a slide travelable in the Y direction and having motors that control the movement of the X slide, the second X slide and of the Y slide or slides, wherein both every X drive motor and every Y drive motor are in fixed positions.

22. The liquid handling apparatus in accordance with claim 21, wherein the working head that is movable in a Z direction by a Z slide if required is configured in a task specific manner to carry out at least one of the following tasks: autosampling, sample introduction/sample extraction, aliquot introduction/aliquot extraction, fraction collection/fraction removal/fraction pooling, container flushing, sucking off of flushing liquid, container cleaning.

23. The liquid handling apparatus in accordance with claim 21, wherein the X drive motor moves the X slide via a force transmission means and simultaneously effects a movement of the Y slide associated with this X slide, and wherein the Y drive motor that is independent of the X drive motor imparts a movement superposed on the movement of the Y slide by the X drive motor.

24. The liquid handling apparatus according to claim 1 wherein the further travel movement is additively or subtractively superposed on the Y slide by the Y drive motor.

* * * * *